United States Patent Office 3,153,252
Patented Oct. 20, 1964

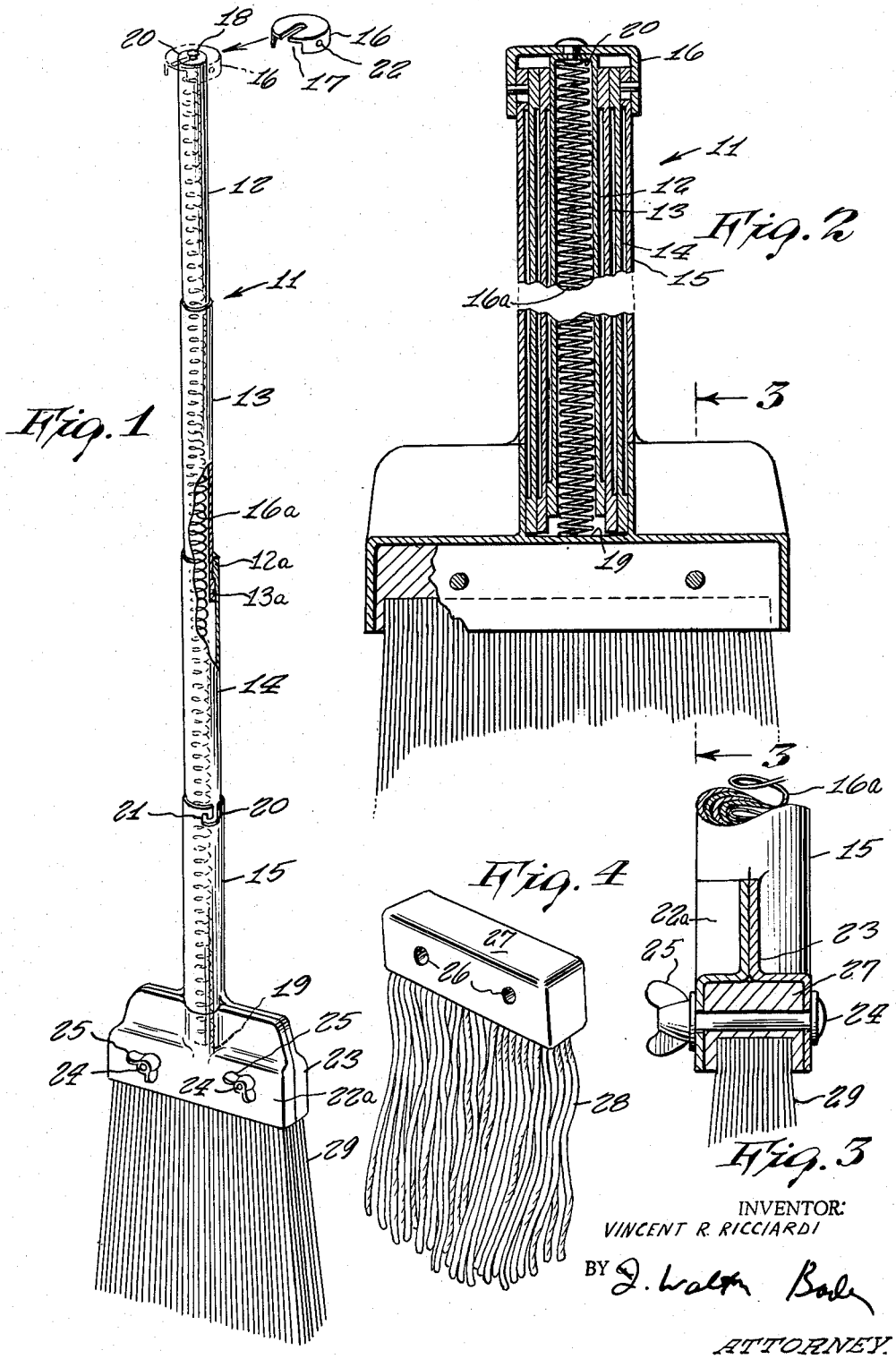

3,153,252
TELESCOPING IMPLEMENT HANDLE
Vincent R. Ricciardi, 10 Kay Ave., Jericho, N.Y.
Filed Apr. 9, 1963, Ser. No. 271,780
3 Claims. (Cl. 15—143)

This invention relates to a telescoping implement handle which may be used either by itself or as an integral part of a product. When the handle of this invention is used alone it may be made to fit several different products such as a broom, mop, sponge, applicators, buffers, etc. The instant handle may also be used for garden tools, wheelbarrows, spreaders, lawn mowers, etc.

The instant invention may be briefly described as an implement handle comprising a telescoping hollow body member formed into a plurality of sections, an expansible spring member disposed within the body member, a cap disposable about the top of the body member, and means for locking the handle in collapsed telescope position.

Because of the use of the expansible member within the instant invention the device will immediately spring into normal extended position when the telescoping devices are released.

The invention will be further described by reference to the accompanying drawings which are made a part of this specification.

FIG. 1 is a front perspective view of the handle of this invention as secured to a broom.

FIG. 2 is a cross-sectional view, on an enlarged scale, showing the position of the parts when the handle of FIG. 1 is in collapsed telescoped position.

FIG. 3 is a sectional view of the device shown in FIG. 2 taken along lines 3—3 of FIG. 2.

FIG. 4 is a detail perspective view of a mop portion of an implement which may be substituted for the broom portion of FIG. 1.

The invention will be further described by reference to the specific forms thereof shown in the accompanying drawings which represent the best modes known to the inventor for taking advantage of his invention.

Referring now to the construction shown in FIGS. 1–4 the implement handle 11 of this invention is formed with a plurality of telescoping sections 12, 13, 14 and 15 one above another and a cap 16 which is designed to be disposed above the sections when said sections are in collapsed position. Cap 16 is formed with a recess 17 therewithin and section 12 bears a button 18 thereupon. Sections 12, 13, 14 and 15 are hollow and intercommunicate with one another on the interior surfaces thereof. Section 14 bears a shoulder 12a and section 13 an abutment 13a. Sections 15 and 14 and sections 13 and 12 bear similar shoulders and abutments (not shown). A coil spring 16a normally bears against the bottom 19 of section 15 and the top 20 of section 12 and normally holds these sections in extended position. Section 15 is formed with opposed recesses 20 each of which has a locking portion 21 thereupon. A pair of opposed detents 22 carried by cap 16 are adapted to fit within recesses 20 and to be held in position by locking portions 21 when the handle is in collapsed position. An implement support formed of two complementary sections 2a and 23 is secured to section 15 of handle 11. A pair of screws 24 pass through sections 22 and 23 and a pair of nuts 25 are disposed upon screws 24. Screws 24 also pass through holes 26 provided within holder 25 which in turn bears implement devices such as a mop portion 28, a broom portion 29, or the like. Holder 27 is thus secured between sections 22 and 23 by screws 24 and nuts 25 as shown in FIG. 3.

In collapsing the form of invention shown in FIGS. 1–4 top section 12 of handle 11 is pushed downwardly, cap 16 placed beneath button 18 and then the detents upon cap 16 engaged with recesses 20 and locked within portions 21. Cap 16 is positioned as shown in FIGS. 1 and 2.

The handle is extended by reversing the process set forth hereinabove.

I claim:
1. A device of the class described comprising a support adapted to hold an implement therewithin, a handle secured to said support formed with a plurality of hollow telescoping sections, one above another, the interior of said sections being in registration with one another, stop means upon adjacent telescoping sections for limiting outward movement thereof, an expansible coil spring retained within said sections and normally adapted to bias said sections outwardly, a removable cap member retainable across the top of the uppermost section of said handle, slidable fast coupling means securing said cap to said top, said cap member having a pair of opposed detents therewithin, and means upon the bottommost section of said handle for removably retaining said detents so as to maintain said handle in collapsed position.

2. A device of the class described comprising a bottom support adapted to hold an implement therewithin, a handle secured to said support formed with a plurality of hollow telescoping sections, one above another, the interior of said sections being in registration with one another, stop means upon adjacent telescoping sections for limiting outward movement thereof, an expansible coil spring retained within said sections and normally adapted to bias said sections outwardly, said bottommost section of said handle provided with a pair of opposed recesses having locking portions thereupon, said uppermost section of said handle having a button portion at the top thereof, a removable cap member provided with an elongated recess therewithin removably retainable beneath said button, said cap member also having a pair of opposed detents therewithin, said detents being retainable within said locking portions of the recesses upon the bottommost telescoping section when said sections are in collapsed position so as to retain them in said position.

3. A device of the class described comprising a bottom support, an implement secured within said bottom support, a handle secured to said support and outwardly projecting therefrom, said handle formed with a plurality of hollow telescoping sections, one above another, the interior of said sections being in registration with one another, stop means upon adjacent telescoping sections for limiting outward movement thereof, an expansible coil spring retained within said sections and normally adapted to bias said sections outwardly, said bottommost section of said handle provided with a pair of opposed recesses having locking portions thereupon, said uppermost section of said handle having a button portion at the top thereof, a removable cap member provided with an elongated recess therewithin removably retainable beneath said button, said cap member also having a pair of opposed detents therewithin, said detents being retainable within said locking portions of the recesses upon the bottommost telescoping section when said sections are in collapsed position so as to retain them in said position.

References Cited by the Examiner
UNITED STATES PATENTS

| 705,271 | 7/02 | Miner | 15—609 |
| 1,632,639 | 6/27 | Weise | 135—46 |
| 2,606,050 | 8/52 | Morris et al. | 287—58 |
| 2,733,885 | 2/56 | Brown et al. | 287—58 |
| 2,984,852 | 5/61 | George | 15—144 |

FOREIGN PATENTS

| 21,041 | 2/16 | Denmark. |
| 206,062 | 11/23 | Great Britain. |
| 549,472 | 4/32 | Germany. |

CHARLES A. WILLMUTH, Primary Examiner.